United States Patent
Huprikar et al.

(10) Patent No.: US 7,172,182 B2
(45) Date of Patent: Feb. 6, 2007

(54) MIXED MODE MOUNTING ASSEMBLY FOR SHOCK/STRUT ROD

(75) Inventors: Anand Huprikar, Novi, MI (US); Nathaniel Mitchell, Riverview, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 10/619,913

(22) Filed: Jul. 15, 2003

(65) Prior Publication Data

US 2005/0012256 A1 Jan. 20, 2005

(51) Int. Cl.
*B60G 11/22* (2006.01)

(52) U.S. Cl. ...................... 267/293; 267/153
(58) Field of Classification Search ............. 267/257, 267/258, 35, 293, 294, 152, 153, 292; 280/124.155
See application file for complete search history.

(56) References Cited

U.S. PATENT DOCUMENTS

| | | | |
|---|---|---|---|
| 3,350,042 A * | 10/1967 | Stewart et al. ........... 267/141.4 |
| 4,298,193 A | 11/1981 | Mourray | |
| 4,434,977 A | 3/1984 | Chiba | |
| 4,478,396 A | 10/1984 | Kawaura | |
| 4,756,516 A * | 7/1988 | Tondato ..................... 267/153 |
| 4,798,370 A | 1/1989 | Inuzuka | |
| 4,804,169 A | 2/1989 | Hassan | |
| 4,805,886 A | 2/1989 | Hassan | |
| 5,000,429 A | 3/1991 | Wittmar | |
| 5,158,269 A | 10/1992 | Hein | |
| 5,248,134 A | 9/1993 | Ferguson | |
| 5,330,166 A | 7/1994 | Aoki | |
| 5,585,413 A * | 12/1996 | Nagashima ................ 521/159 |
| 5,975,505 A | 11/1999 | Yoshimoto | |
| 6,076,794 A * | 6/2000 | Pradel ........................ 267/220 |
| 6,155,544 A | 12/2000 | Solomond | |
| 6,182,953 B1 | 2/2001 | Smith | |
| 6,260,835 B1 | 7/2001 | Angles | |
| 6,296,237 B1 | 10/2001 | Nagai | |
| 6,412,798 B2 | 7/2002 | De Fontenay | |
| 6,435,489 B1 * | 8/2002 | Rice et al. ............... 267/140.5 |
| 6,485,008 B1 | 11/2002 | Griffin | |
| 6,502,883 B2 | 1/2003 | Rice | |
| 2001/0015537 A1 | 8/2001 | De Fontenay | |

FOREIGN PATENT DOCUMENTS

GB        1132954 A  *  11/1968
JP        402309028 A     5/1989

* cited by examiner

*Primary Examiner*—Xuan Lan Nguyen
(74) *Attorney, Agent, or Firm*—Fernando A. Borrego

(57) ABSTRACT

A mounting assembly for a wheel suspension system of a vehicle. The mounting assembly includes a support structure mounted to the vehicle body. A piston rod, along with a plate, is displaceable relative to the support structure along a line of travel. An insulator is disposed between the support structure and the plate for coupling the piston rod to the support structure. The insulator has a first portion defining a first resistance for isolating the displacement of the piston rod and the plate during an application of a first force which compresses the first portion only. The insulator also has a second portion defining a second resistance, with the second resistance being greater than the first resistance, for limiting the displacement of the piston rod and the plate during an application of a second force wherein the second force is greater than the first force such that both the first and second portions are compressed.

13 Claims, 4 Drawing Sheets

MIXED MODE MOUNTING ASSEMBLY FOR SHOCK/STRUT ROD

BACKGROUND OF THE INVENTION

1. Field of the Invention

The subject invention relates to a mounting assembly for a wheel suspension system of a vehicle wherein the mounting assembly has an insulator for isolating and/or translating movement of the wheel suspension system.

2. Description of Related Art

Mounting assemblies for wheel suspension systems of vehicles are well known in the art. Examples of such mounting assemblies are shown in U.S. Pat. Nos. 4,434,977; 4,478,396; 5,248,134; 5,330,166; 5,975,505; 6,076,794; and 6,260,835. Each of these mounting assemblies include a rigid support structure mounted to a chassis or frame of a vehicle. A piston rod extends from the wheel suspension system through the support structure. One or more insulators couple the piston rod to the support structure and allow for small relative movement of the piston rod to the support structure. The insulators also isolated the vibrations of the piston rod during an application of a force from the wheel suspension system, without causing excessive displacement.

The prior art mounting assemblies typically include at least one insulator abutting the support structure and surrounding the piston rod. Also, a jounce bumper is typically disposed about the piston rod to isolate and/or transmit intermittent high amplitude movements of the wheel suspension system. The prior art insulators and jounce bumper are frequently formed of an elastomeric rubber or cellular polyurethane material.

Many of these known mounting assemblies can fall into one of two categories, which are a single path design or a dual path design. Examples of the single path design are shown in the '166, '505, and '794 patents. In the single path designs, the jounce bumper rests in a steel cup that forms a bottom plate of the assembly. The jounce bumper in this design is able to pivot along with the piston rod and can be formed of a relatively thick wall, which increases durability of the jounce bumper. An insulator is disposed on each side (top and bottom) of the support structure above the jounce bumper surrounding the piston rod. Small amplitude vibrations or displacements of the piston rod are isolated by the insulators. Intermittent high amplitude movements of the wheel suspension system are isolated and/or transmitted by the jounce bumper and insulators.

It would be preferred that the insulators be formed of a low density material to maximize the isolation characteristics. However, due to the configuration and positioning of the insulators in the single path design, the large loads due to intermittent high amplitude movements of the wheel suspension system are also transmitted through the insulators. The insulators must therefore be molded of a high density material to withstand these large loads. As a result, the small amplitude vibration or displacement isolation characteristics are diminished.

In the dual path designs, the jounce bumper rests in a cup that is rigidly fixed to the support structure. An example of a dual path design is shown in the '396 patent. The piston rod is connected to an insert enclosed by a single insulator. As in single path designs, small amplitude vibrations or displacements of the piston rod are isolated by the insulator. However, unlike the single path design, the intermittent high amplitude movements of the wheel suspension system are only isolated and/or transmitted by the jounce bumper directly into the support structure. Hence, the insulator can be formed of a lower density material for improved optimization of isolating the small amplitude vibrations of the piston rod.

Although the dual path design has some improved performance characteristics over the single path design, the dual path design has its deficiencies. For example, the jounce bumper in the dual path design typically does not move with the piston rod. As such there must be a greater clearance between the piston rod and the jounce bumper. This in turn requires that the jounce bumper have a thinner wall which can affect durability. In addition, the dual path design is more difficult and more expensive to manufacture than the single path design.

Accordingly, it would be desirable to develop a mounting assembly that captures the advantages of both the single and dual path designs while avoiding the deficiencies with these designs.

SUMMARY OF THE INVENTION AND ADVANTAGES

A mounting assembly for a wheel suspension system of a vehicle having a vehicle body or chassis. The mounting assembly comprises a support structure having an aperture and adapted to be mounted to the vehicle body. A piston rod is at least partially disposed within the aperture and is displaceable relative to the support structure along a line of travel. A plate is mounted to the piston rod and moves relative to the support structure during the displacement of the piston rod. An insulator is disposed between the support structure and the plate for coupling the piston rod to the support structure. The insulator has a first portion defining a first resistance for isolating the displacement of the piston rod and the plate during an application of a first force along the line of travel in a first direction which at least partially compresses the first portion. The insulator also has a second portion defining a second resistance with the second resistance being greater than the first resistance for isolating and translating the displacement of the piston rod and the plate after the application of the first force and during an application of a second force along the line of travel in the first direction wherein the second force is greater than the first force such that both the first and second portions are at least partially compressed.

Accordingly, the subject invention incorporates the simplified and relatively inexpensive configuration of the single path design as well as the operational advantages of the dual path design. In particular, the subject invention incorporates the advantage of the dual path design by having the intermittent high amplitude loads translated from the jounce bumper directly into the support structure. As such, the insulator can be formed of a lower density material for optimizing the isolation characteristics. Thus, in this "mixed mode" design the combined advantages are obtainable due to the unique configuration of the insulator having the first and second portions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
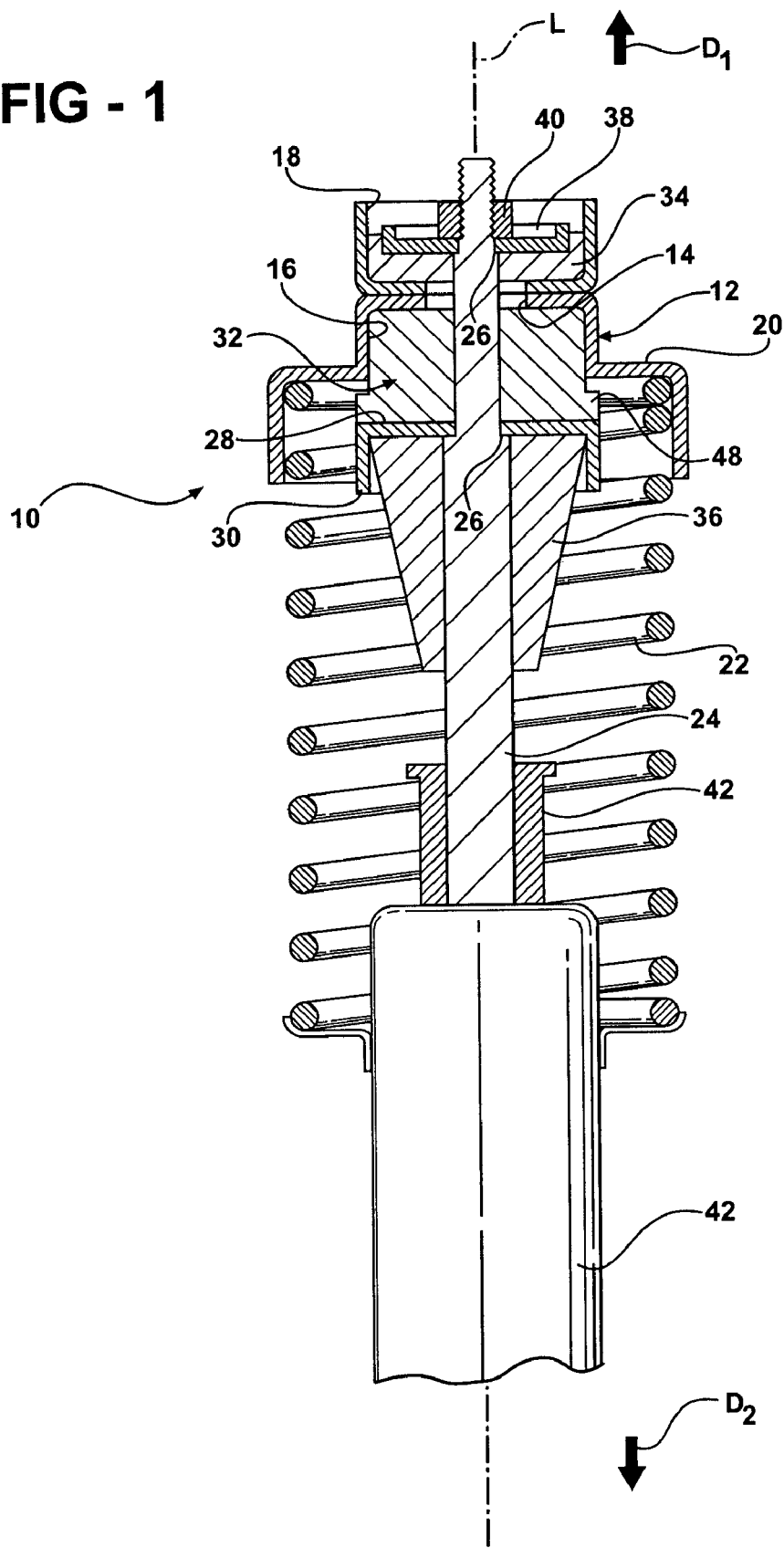
FIG. 1 is a cross-sectional side view of the subject invention in a rest state.

Referring to the Figures, wherein like numerals indicate like or corresponding parts throughout the several views, a mounting assembly in accordance with the subject invention is generally shown at 10 in FIG. 1. The mounting assembly 10 is shown in a rest state in this Figure. In the preferred embodiment, the mounting assembly 10 is for a wheel suspension system of a vehicle having a vehicle body (not shown). The wheel suspension system is only partially illustrated in the Figures. Wheel suspension systems for vehicles are well known in the art and as such will not be discussed in any greater detail. In addition, it should be appreciated by those skilled in the art that any suitable suspension system and any type of vehicle body could be used in conjunction with the subject invention.

The mounting assembly 10 includes a support structure 12 having an aperture 14. The support structure 12 is preferably a stamped piece of metal configured to define a number of different cavities for a number of different functions. Of course the support structure 12 could be of any suitable design or configuration without deviating from the overall scope of the subject invention. Specifically, the support structure 12 has an upper appendage (not shown) for mounting the support structure 12 to the vehicle body as is known in the art. In addition, the support structure 12 includes a first cup 16 and a second cup 18 with the cups 16, 18 facing in opposite directions from each other. The first 16, and second 18 cups define two of the cavities. The support structure 12 also includes a flange 20 extending outwardly from the first cup 16 for defining yet another cavity. The flange 20 has a substantially cup-shaped configuration for providing a seat for a coiled spring 22 of the wheel suspension system.

A piston rod 24 is at least partially disposed within the aperture 14 and is displaceable relative to the support structure 12 along a line of travel L in either a first $D_1$ or second $D_2$ direction. The first $D_1$ and second $D_2$ directions, as indicated by the arrows in FIG. 1, are opposing directions along the line of travel L. It should be appreciated, that the piston rod 24 may also be displaced angularly relative to the line of travel L. As will be discussed in greater detail below, the piston rod 24 is coupled to the support structure 12 and experiences small amplitude vibrations or displacements. The shock tube 42 experiences intermittent high amplitude movements during the operation of the wheel suspension system. The piston rod 24 includes a plurality of notches or seats 26, the purpose of which will be discussed in greater detail below.

A plate 28 is mounted to the piston rod 24 and moves relative to the support structure 12 during the displacement of the piston rod 24. Preferably, the plate 28 abuts one of the notches 26 in the piston rod 24 to mount the plate 28 to the piston rod 24. The plate 28 also includes a peripheral wall 30 extending outward therefrom to define a cup-shaped plate 28.

In order to couple the piston rod 24 to the support structure 12 and to provide the necessary isolation for the mounting assembly 10, the subject invention includes at least one and preferably a number of isolation elements 32, 34, 36. In particular, the preferred isolation elements include first 32 and second 34 insulators and a jounce bumper 36. It should be appreciated that the subject invention is in no way limited to having two insulators 32, 34 and a jounce bumper 36 and it is contemplated that the subject invention could include fewer isolation elements.

In the preferred embodiment, the first insulator 32 is disposed between the support structure 12. Preferably, the first insulator 32 is mounted to the plate 28 and disposed within the first cup 16 of the support structure 12. The first insulator 32 is formed of an elastomeric material such as rubber or micro-cellular polyurethane. The mico-cellular polyurethane material is preferred but not required for the subject invention. The specific configuration and operation of the first insulator 32 will be discussed in greater detail below.

Also in the preferred embodiment, the second insulator 34 is mounted to the support structure 12 for further coupling the piston rod 24 to the support structure 12 and for isolating the displacement of the piston rod 24 and the plate 28 when a force is applied along the line of travel L. Preferably, the second insulator 34 is mounted within the second cup 18 of the support structure 12 above the first insulator 32. The second insulator 34 is likewise formed of an elastomeric material such as rubber or micro-cellular polyurethane. The second insulator 34 has a substantially cylindrical configuration with an opening disposed therein for allowing a distal end of the piston rod 24 to pass through the second insulator 34. A spacer washer 38 abuts one of the notches 26 in the piston rod 24 and rests on plate 28. A bolt 40 secures the spacer washer 38 to the piston rod 24. The second insulator 34 is positioned between the spacer washer 38 and the second cup 18.

The jounce bumper 36, as is contemplated by the preferred embodiment, is disposed about the piston rod 24 for isolating impacts of the wheel suspension system. The jounce bumper 36 is preferably mounted to the cup-shaped plate 28 on an opposite side from the first insulator 32. The jounce bumper 36 has a frustoconical configuration with an opening for allowing passage of the piston rod 24. The jounce bumper 36 is not mounted to the piston rod 24 and has an inner diameter configured such that the displacements of the piston rod 24 along directions $D_1$ and $D_2$ are not transmitted into the jounce bumper 36. Portions of the wheel suspension system, such as a shock tube 42, engage the jounce bumper 36 during intermittent high amplitude movements of the suspension system. As with the insulators 32, 34 discussed above, the jounce bumper 36 is formed of an elastomeric material such as rubber or micro-cellular polyurethane. The jounce bumper 36, however, is formed of an appropriate elastomeric material to adequately translate the high amplitude movements of the shock tube 42.

Figure 2:
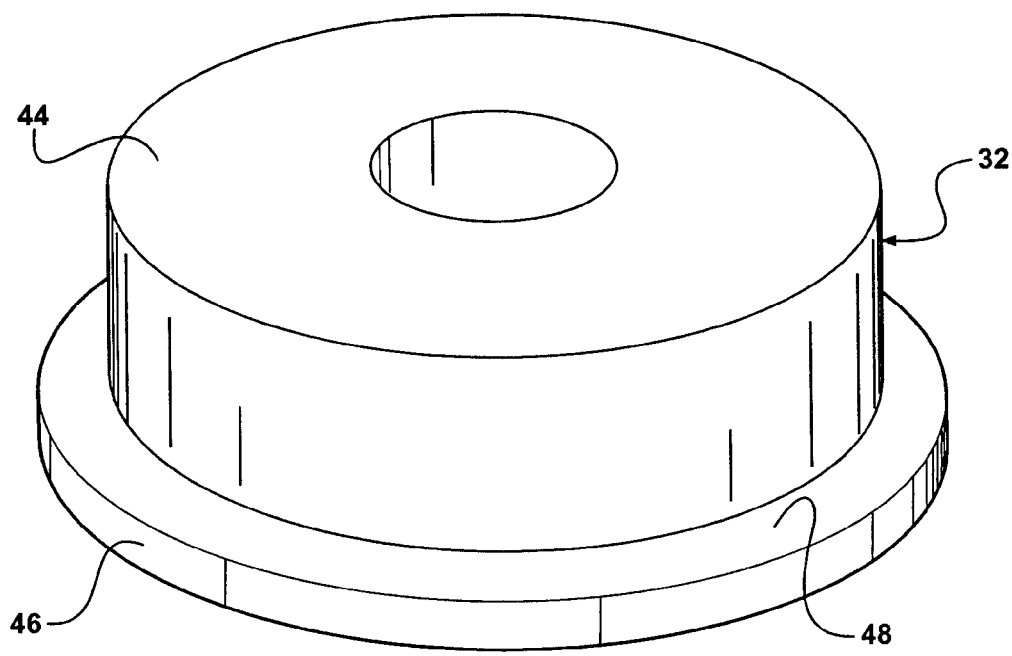
FIG. 2 is a perspective view of a first insulator in accordance with the subject invention.
Figure 3:
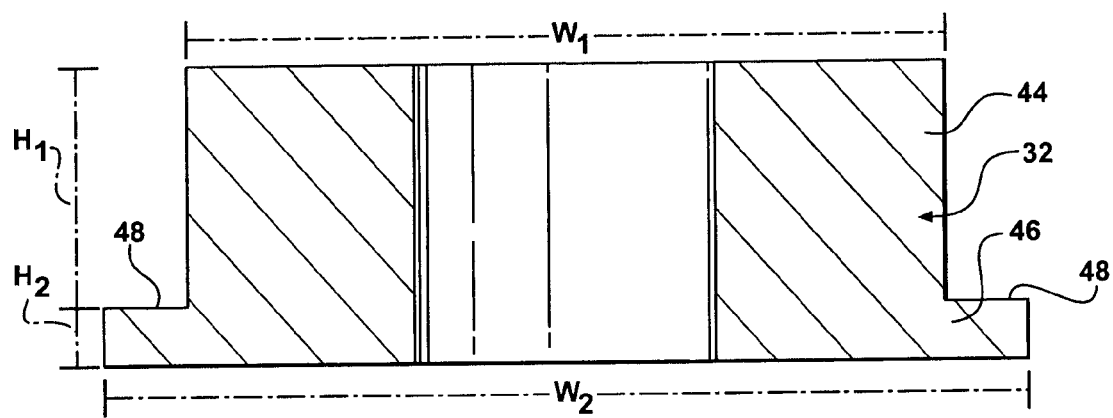
FIG. 3 is a cross-sectional view of the first insulator of FIG. 2.

Referring also to FIGS. 2 and 3, the first insulator 32 is discussed in greater detail. The first insulator 32 has a first portion 44 and a second portion 46. In assembled state the insulators 32 and 34 are pre-compressed 25% to 40%, most preferably 30%, by selecting proper height of spacer washer 38. Preferably, the first 44 and second 46 portions of the first insulator 32 are formed of the same material. More preferably, the first 44 and second 46 portions of the first insulator 32 are formed of a common homogeneous material. Most preferably, the common homogeneous elastomeric material is further defined as micro-cellular polyurethane.

As best shown in FIG. 3, the first portion 44 of the first insulator 32 has a first maximum width $W_1$ and the second portion 46 of the first insulator 32 has a second maximum width $W_2$ which is larger than the first maximum width $W_1$. The plate 28 has a width at least equal to the second maximum width $W_2$ of the second portion 46 to properly mount the first insulator 32 to plate 28. The larger second maximum width $W_2$ of the second portion 46 defines a ledge 48 on the second portion 46 extending outwardly beyond the width of the first portion 44. As best shown in FIG. 2, the first portion 44 has an annular configuration defining a first circumference and the second portion 46 has an annular configuration defining a second circumference. The second circumference is larger than the first circumference to define an annular ledge 48 on the second portion 46 extending outwardly beyond the circumference of the first portion 44. The annular configuration of the first 44 and second 46 portions allow for proper insertion into the first cup 16 of the support structure 12. It is also preferred that the first portion 44 and the second portion 46 having the annular ledge 48 are formed of a common homogeneous elastomeric material, such as mico-cellular polyurethane.

In addition, as shown in FIG. 3, the first portion 44 has a first height $H_1$ and the second portion 46 has a second height $H_2$ smaller than the first height $H_1$. Preferably, the first height $H_1$ is approximately 3 times larger than the second height $H_2$. The first height $H_1$ can range from 5 mm to 50 mm and the second height $H_2$ can range from 2 mm to 10 mm. Of course, any suitable height of the first 44 and second 46 portions can be utilized depending upon the desired application.

Figure 4:
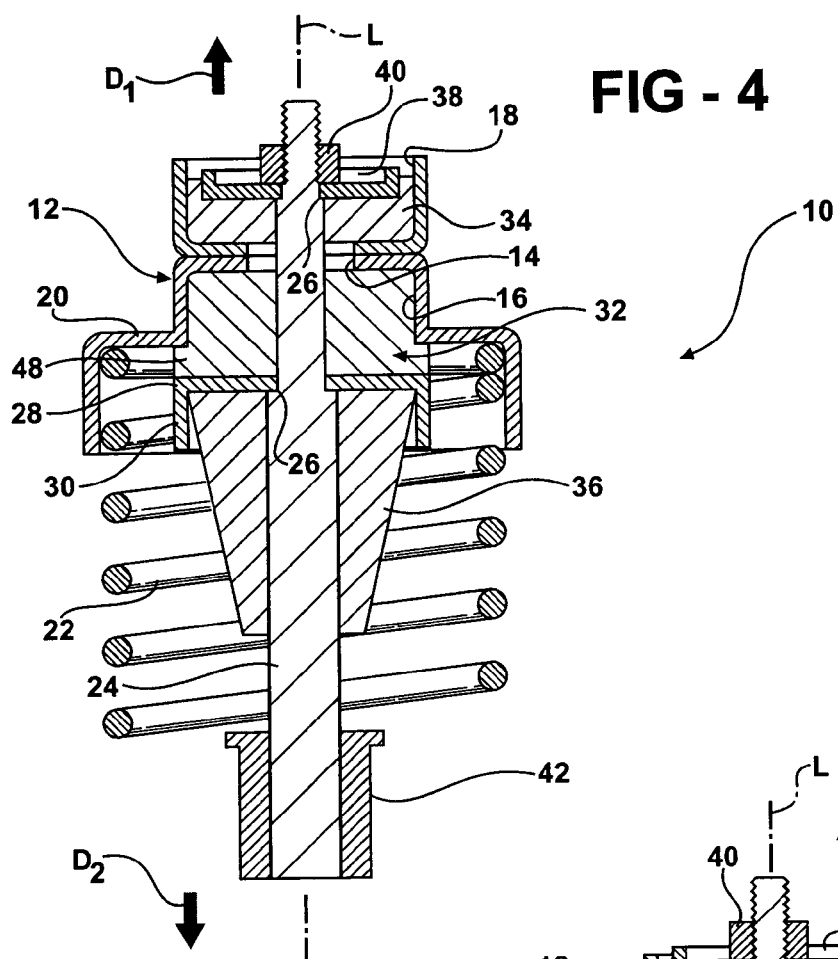
FIG. 4 is a cross-sectional side view of the subject invention in a first state when a first force is applied.
Figure 5:
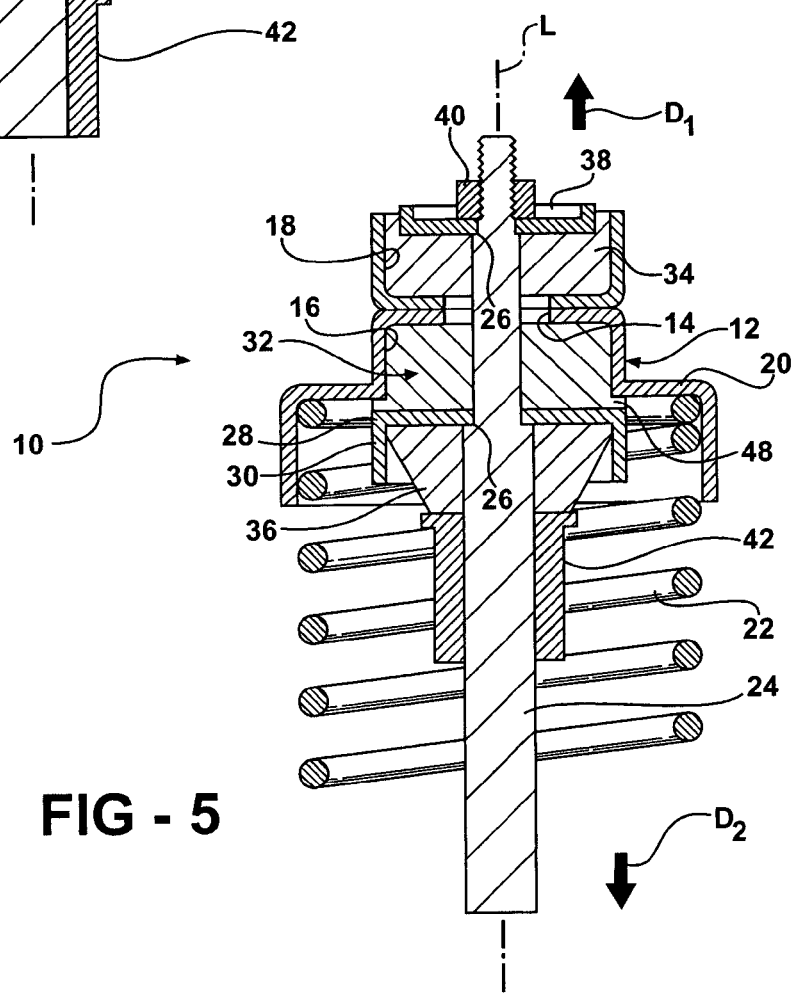
FIG. 5 is a cross-sectional side view of the subject invention in a second state when a second force is applied.

Turning also to FIGS. 4 and 5, the mounting assembly 10 is shown in different operational positions. In particular, FIG. 4 illustrates the mounting assembly 10 in a first state when a first force is applied to isolate small amplitude vibrations or displacements of the piston rod 24. Small amplitude vibrations or displacements are generally associated with higher frequencies and lower amplitudes and hydraulic loads. FIG. 5 illustrates the mounting assembly 10 in a second state when a second force is applied to translate intermittent high amplitude movements of the wheel suspension system. Intermittent high amplitude movements are usually associated with lower frequencies and larger amplitudes and come through the jounce bumper 36. The first 32 and second 34 insulators are primarily designed to isolate the small amplitude vibrations or displacements of the piston rod 24 and not translate these loads. The jounce bumper 36 is primarily designed to translate the intermittent high amplitude movements of the wheel suspension system. The details of how the isolation and translation occurs is discussed in greater detail below.

The first portion 44 of the first insulator 32 defines a first resistance for isolating the displacement of the piston rod 24 and the plate 28 during an application of the first force along the line of travel L in the first direction $D_1$ which at least partially compresses the first portion 44. The first force is also defined as a particular load which creates the small amplitude vibrations or displacements of the piston rod 24. Typical loads of the first force are less than 2 KN. This is generally maximum load generated by hydraulics of shock absorber. In the preferred embodiment, the first cup 16 at least partially surrounds the first portion 44 and compresses the first portion 44 without compressing the ledge 48 and the second portion 46 when the first force is applied. The second insulator 34 also isolates the displacement of the piston rod 24 and the plate 28 when the first force is applied along the line of travel L in the first direction $D_1$. The second insulator 34, however, expands as opposed to being compressed during an application of a force in the first direction $D_1$. The partial compression of the first portion 44 of the first insulator 32 and the expansion of the second insulator 34 are shown in FIG. 4. Although not illustrated, it is appreciated that the first portion 44 of the first insulator 32 will expand and the second insulator 34 will at least partially compress during an application of a force along the line of travel L in the second direction $D_2$. Further, the first portion 44 of the first insulator 32 and the second insulator 34 may both partially expand and/or compress during an application of a force that is angularly applied along the line of travel L. In other words, the first portion 44 of the first insulator 32 and the second insulator 34 may both partially expand and/or compress as the piston rod 24 pivots relative to the support structure 12.

The second portion 46 of the first insulator 32 defines a second additional resistance with the second resistance being greater than the first resistance for controlling the displacement of the piston rod 24 and the plate 28 after the application of the first force and during an application of a second greater force along the line of travel L in the first direction $D_1$. The second force, which is also defined as a particular load which creates intermittent high amplitude movements of the wheel suspension system, is greater than the first force such that both the first 44 and second 46 portions are at least partially compressed. Typical loads of the second force range from 2 to 20 KN. This is generally load generated by the jounce bumper 36. The second portion 46 of the first insulator 32 is therefor designed to not only isolate but to also translate loads. In the preferred embodiment, the flange 20, extending outwardly from the first cup 16, engages and compresses the ledge 48 of the second portion 46 during the application of the second force to translate loads of the second force from the plate 28 to the support structure 12. The second insulator 34 also isolates the initial displacement of the piston rod 24 and the plate 28 when the second force is applied along the line of travel L in the first direction $D_1$. As stated above, the second insulator 34 expands as opposed to being compressed during the application of a force in the first direction $D_1$. The compression of both the first 44 and second 46 portions of the first insulator 32 and expansion of the second insulator 34 is shown in FIG. 5. Due to the preferred configuration of the mounting assembly 10, the first portion 44 is at least partially compressed before the second portion 46 is at least partially compressed.

The jounce bumper 36 also translates loads from the application of the second force, i.e., the intermittent high amplitude movements of the wheel suspension system. In particular, the wheel suspension system, such as the shock tube 42, engages the jounce bumper 36 to significantly compress the jounce bumper 36 as shown in FIG. 5. The loads experienced by the jounce bumper 36 are then translated into the plate 28 which in turn translates some of the forces into the first 32 and second 34 insulators as discussed above. The first 44 and second 46 portions of the first insulator 32 compresses which wedges the ledge 48 inbetween the flange 20 of the support structure 12 and the plate 28. The plate 28 can now translate loads through the ledge 48 of the second portion 46 and into the support structure 12. This ensures that the loads from the second force are only minimally translated into the first 32 and second 34 insulators. This allows the first 32 and second 34 insulators to be formed of a softer (lower density) elastomeric material for optimizing the isolation characteristics. The advantages of the subject invention are obtainable due to the unique configuration of the first insulator 32 having the first 44 and second 46 portions.

Figure 6:
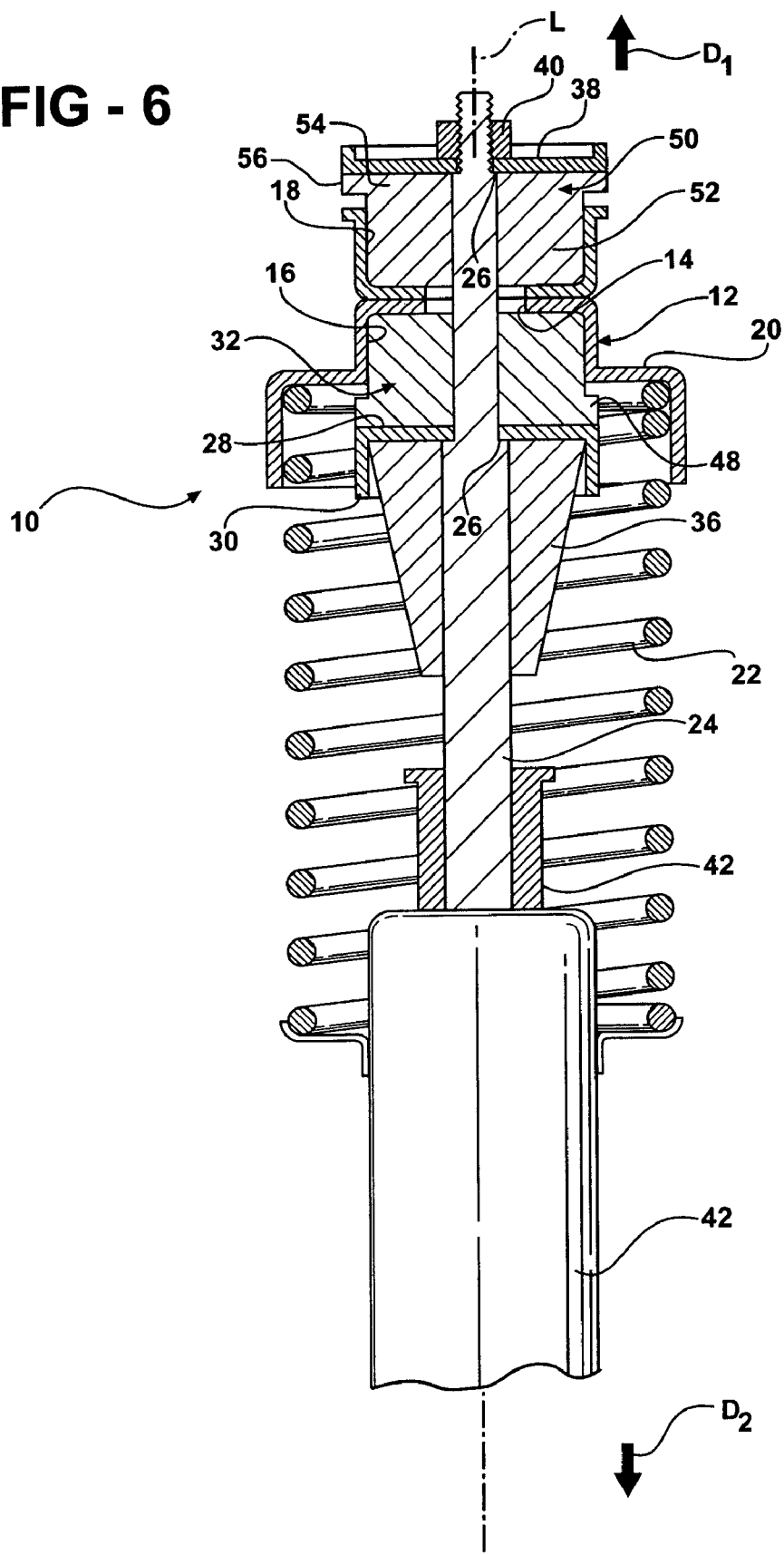
FIG. 6 is a cross-sectional side view of an alternative embodiment of the subject invention in a rest state.

Referring to FIG. 6, an alternative embodiment of the mounting assembly 10 is shown. The support structure 12, plate 28, first insulator 32, and jounce bumper 36 are substantially the same and operate in substantially the same manner as in the preferred embodiment. The mounting assembly 10 of this embodiment, however, has a unique second insulator 50. The second insulator 50 is similar to the first insulator 32 with a first portion 52 and a second portion 54. The second portion 54 is wider than the first portion 52 to define a ledge 56 on the second portion 54 extending outwardly beyond the width of the first portion 52. As with the primary embodiment, it is preferred that the first portion 52 and the second portion 54 having the ledge 56 be formed of a common homogeneous material, such as micro-cellular polyurethane.

The first portion 52 of the second insulator 50 defines a first resistance for isolating the displacement of the piston rod 24 during an application of a first force along the line of travel L in a second direction $D_2$ which at least partially compresses the first portion 52. The first insulator 32 also isolates the displacement of the piston rod 24 during an application of the first force along the line of travel L in the second direction $D_2$.

The second portion 54 of the second insulator 50 defines a second resistance with the second resistance being greater than the first resistance for translating the displacement of the piston rod 24 after the application of the first force and during an application of a second force along the line of travel L in the second direction $D_2$. The washer 38, which is mounted to the piston rod 24, engages and compresses the ledge 56 against the second cup 18 during an application of the second force to translate loads of the second force to the support structure 12.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A mounting assembly for a wheel suspension system of a vehicle having a vehicle body, said mounting assembly comprising:

a support structure having an aperture and adapted to be mounted to the vehicle body;

a piston rod at least partially disposed within said aperture and displaceable relative to said support structure along a line of travel;

a plate mounted to said piston rod and moving relative to said support structure during said displacement of said piston rod;

an insulator disposed about said piston rod between said support structure and said plate with said insulator abutting said plate for coupling said piston rod to said support structure;

said insulator having a first portion defining a first resistance and a first maximum width for isolating said displacement of said piston rod and said plate during an application of a first force along said line of travel in a first direction which at least partially compresses said first portion, and a second portion defining a second resistance and a second maximum width with said second resistance being greater than said first resistance for controlling said displacement of said piston rod and said plate after said application of said first force and during an application of a second force along said line of travel in said first direction wherein said second force is greater than said first force such that both said first and second portions are at least partially compressed and said second width being larger than said first width to define a ledge on said second portion extending outwardly beyond said width of said first portion; and a jounce bumper disposed about said piston rod and mounted to said plate on an opposite side from said insulator for translating movement of the wheel suspension system during application of said second force;

said plate having a width at least equal to said maximum width of said second portion and a maximum width of said jounce bumper;

said support structure including a first cup defining a cavity and an inner surface with said first portion of said insulator at least partially disposed within said cavity and configured to be contiguous with said inner surface for compressing said first portion without compressing said ledge and said second portion when said first force is applied;

said support structure further including a flange extending outwardly from said first cup with said flange uniformly positioned relative to said ledge for positioning said ledge between said flange and said plate such that during said application of said second force, said ledge of said second portion engages and compresses against said flange to transmit loads of said second force from said plate to said support structure.

2. The assembly as set forth in claim 1 wherein said first portion is at least partially compressed before said second portion is at least partially compressed.

3. The assembly as set forth in claim 1 wherein said first and second portions of said insulator are formed of a common homogeneous material of micro-cellular polyurethane.

4. The assembly as set forth in claim 1 wherein said first portion has a first height and said second portion has a second height smaller than said first height.

5. The assembly as set forth in claim 1 wherein said piston rod includes a notch with said plate abutting said notch to mount said plate to said piston rod.

6. The assembly as set forth in claim 1 wherein said first and second portions of said insulator are formed of the same material.

7. The assembly as set forth in claim 4 wherein said first height is 3 times larger than said second height.

8. The assembly as set forth in claim 1 wherein said first portion has an annular configuration defining a first circumference.

9. The assembly as set forth in claim 8 wherein said second portion has an annular configuration defining a second circumference which is larger than said first circumference to define an annular ledge on said second portion extending outwardly beyond said circumference of said first portion.

10. The assembly as set forth in claim 9 wherein said first portion and said second portion having said annular ledge are formed of a common homogeneous material.

11. The assembly as set forth in claim 1 wherein said insulator is mounted to said piston rod.

12. The assembly as set forth in claim 1 further including a second insulator mounted to said support structure for further coupling said piston rod to said support structure and for further isolating said displacement of said piston rod and said plate when said first force is applied along said line of travel in said first direction.

13. The assembly as set forth in claim 12 wherein said support structure includes a second cup with said second insulator mounted within said second cup.

* * * * *